United States Patent [19]

Sassman

[11] Patent Number: 5,927,669

[45] Date of Patent: Jul. 27, 1999

[54] LAPTOP/NOTEBOOK COMPUTER RELOCATION SUPPORT

[76] Inventor: William A. Sassman, 425 University Ave. - 120, Sacramento, Calif. 95825

[21] Appl. No.: 08/607,182

[22] Filed: Feb. 26, 1996

[51] Int. Cl.$^6$ .................................................. A47B 91/00
[52] U.S. Cl. .................... 248/346.01; 248/678; 248/917; 248/205.2; 248/918
[58] Field of Search ..................... 248/677, 678, 248/346.03, 346.06, 687, 690, 205.2, 177.1, 187.1, 675, 682, 683, 917–922, 924, 345.1, 346.01; 108/43, 44

[56] References Cited

U.S. PATENT DOCUMENTS

| | | | |
|---|---|---|---|
| 1,788,030 | 1/1931 | Penn | 248/687 |
| 1,932,109 | 10/1933 | Judson | 248/687 |
| 2,971,485 | 2/1961 | Hamlett | 248/687 |
| 4,615,502 | 10/1986 | McLaughlin | 248/921 |
| 5,180,134 | 1/1993 | Mallak | 248/346.03 |
| 5,263,423 | 11/1993 | Anderson | 248/444 |
| 5,263,668 | 11/1993 | Reiter | 248/678 |
| 5,309,670 | 5/1994 | Bates | 248/346.1 |
| 5,362,025 | 11/1994 | Trom et al. | 248/917 |
| 5,470,041 | 11/1995 | Cucinotta | 248/346.03 |
| 5,515,573 | 5/1996 | Frey | 248/205.2 |
| 5,553,824 | 9/1996 | Dutra, Jr. | 248/924 |
| 5,623,869 | 4/1997 | Moss et al. | 248/917 |

FOREIGN PATENT DOCUMENTS 334942  1/1930  United Kingdom ................... 248/687

*Primary Examiner*—Ramon Ramirez
*Assistant Examiner*—Gwendolyn Baxter
*Attorney, Agent, or Firm*—Mark C. Jacobs, Esq.

[57] ABSTRACT

A light weight removably attachable support for a laptop/notebook computer which when attached to the underside of the base of the computer will permit the computer to glide a short distance from one person to another when the computer is nudged or pushed slightly across a table top. The support is preferably an annular member with a series of spaced feet thereupon. Each foot has a pad adhesively attached thereto, which pad has a low coeficient of friction. The support may be attached by Velcro® tabs or strips to the underside of the computer. One piece and interlocking multicomponent units are envisioned.

14 Claims, 4 Drawing Sheets

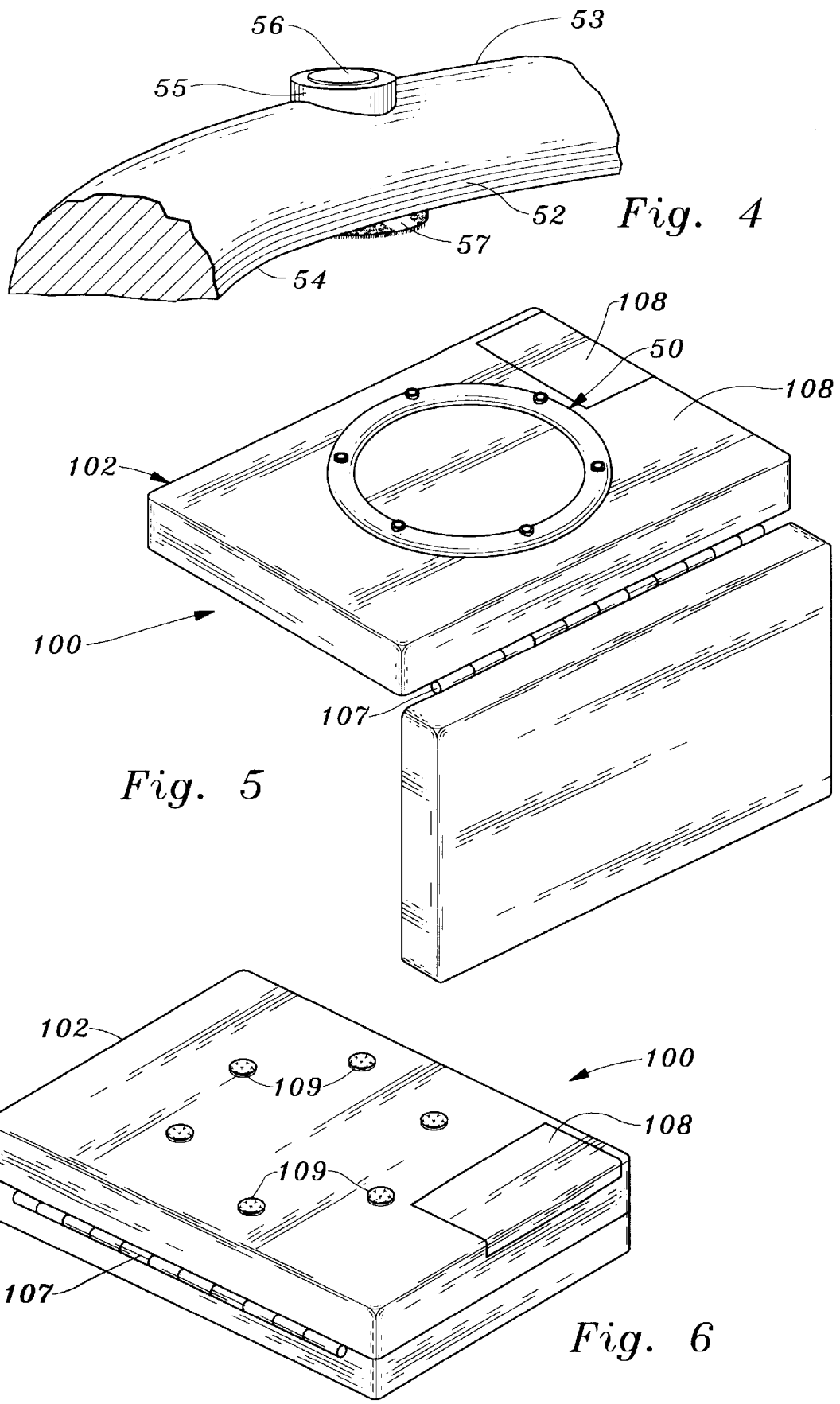

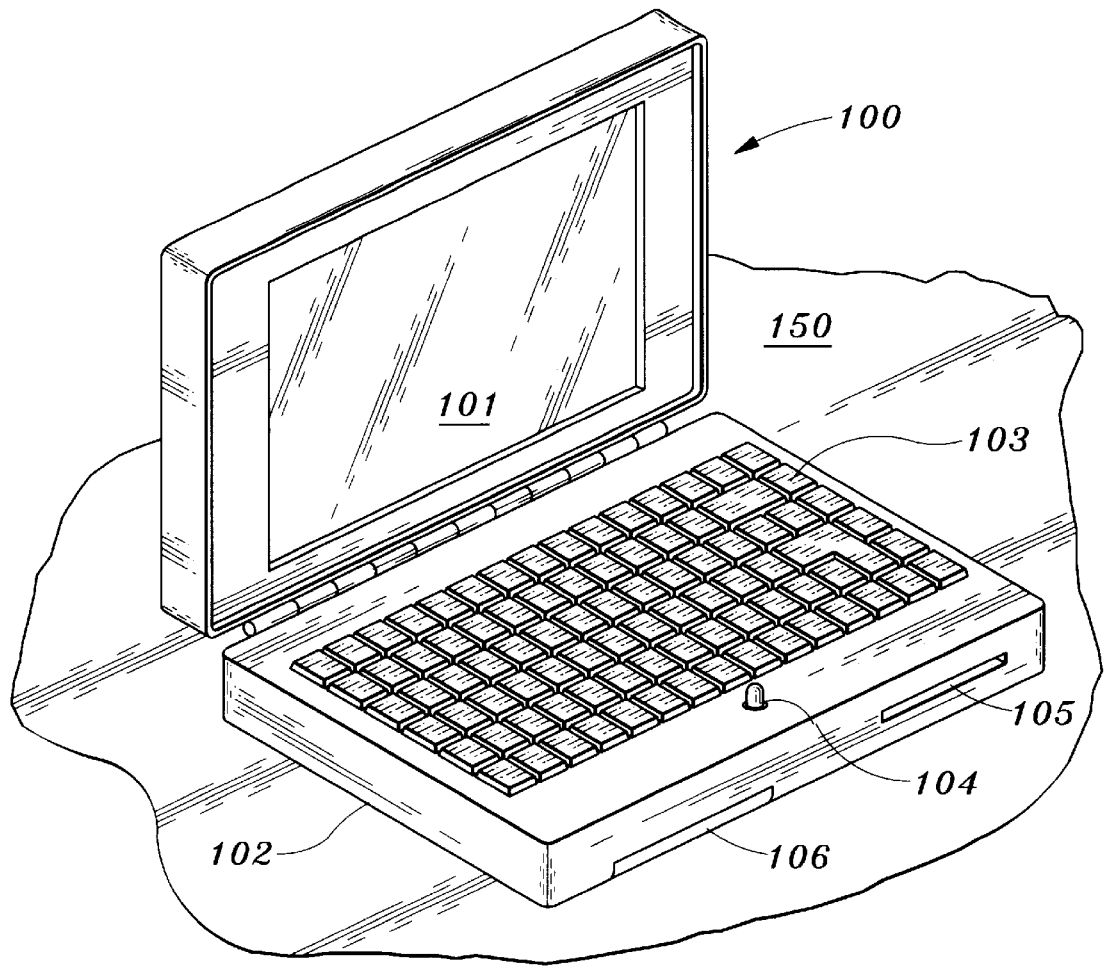
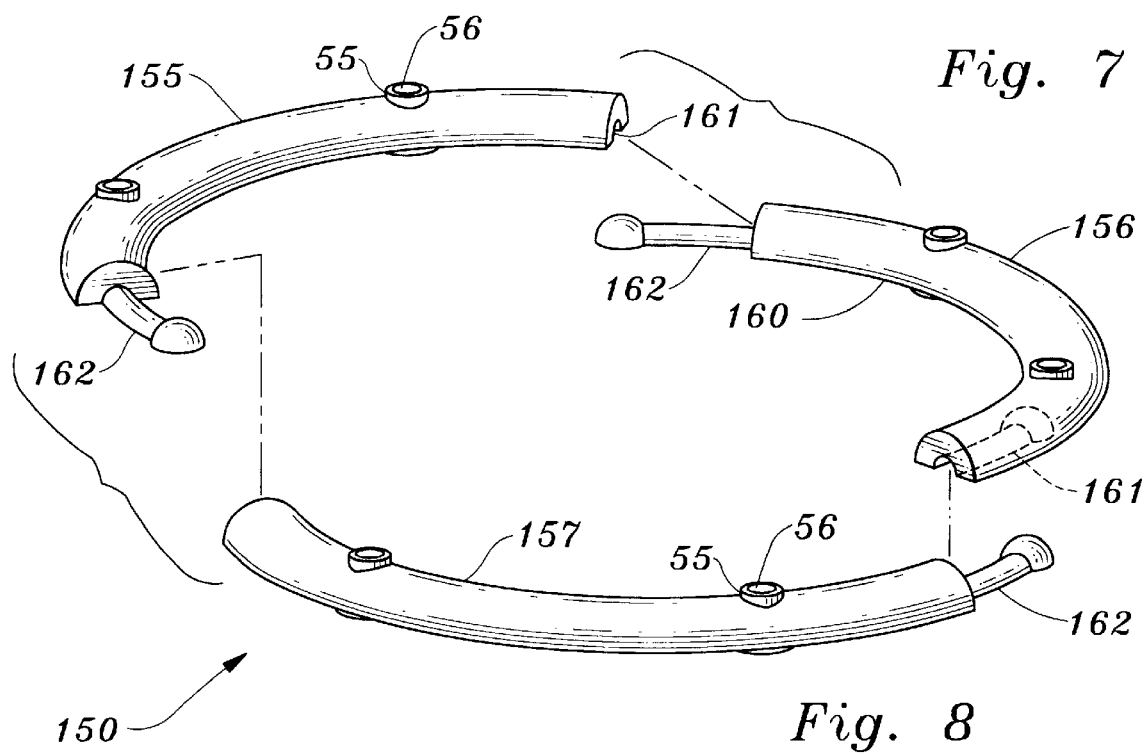
Fig. 7
Fig. 8

5,927,669

LAPTOP/NOTEBOOK COMPUTER RELOCATION SUPPORT

FIELD OF THE INVENTION

This invention relates to a support means for removable attachment to a laptop/notebook computer's base for relocation of the computer as from a salesman to a customer or other situation requiring two viewers of the computer.

BACKGROUND OF THE INVENTION

Oftentimes at meetings it is necessary for a first party to operate the laptop computer such that results or data can be viewed by the client, prospect or customer, the second party. Passive matrix color also known as dual scan color LCDs have a limited viewing angle. The same is true of active matrix and monochrome LCD screens. Thus, it becomes necessary to relocate the computer such that the second viewer can read the screen. But this task often proves to be a difficult one because the base of most laptop/notebooks bear nonskid feet and/or have a crinkly paint finish, both of which tend to inhibit any chance for the computer to slide off the table if pushed.

Thus, there is shown to be a need for laptop/notebook computer relocation means which will permit a computer to be slid a short distance from an operator to a second party, a viewer.

It is an object therefore of this invention to provide a support means affixable to a laptop/notebook computer that will permit the computer to glide a short distance on being pushed on a table top.

A second object is to provide a removably affixed computer relocation support for laptop/notebook computers.

Another object is to provide a low cost support system for laptop/notebook computers which is light in weight and thus easily transportable.

Yet another object is to provide laptop/notebook computer support which can be made as an annular member or as an interlocking multicomponent unit.

These and other objects of the invention will in part be obvious and will in part appear hereinafter.

The invention accordingly comprises the device possessing the features properties and the relation of components which are exemplified in the following detailed disclosure and the scope of the application of which will be indicated in the appended claims.

For a fuller understanding of the nature and objects of the invention reference should be made to the following detailed description, taken in conjunction with the accompanying drawings.

BRIEF DESCRIPTION OF THE FIGURES

FIG. 4 is an inverted bottom perspective view of a section of the device of this invention.

FIG. 5 is a bottom perspective view of a computer showing the device of this invention installed into place in an opened computer.

FIG. 6 is a bottom perspective view of a laptop computer in closed position with the mount means of this invention thereon.

FIG. 7 is a front perspective view of a laptop computer in open position on a tabletop.

FIG. 8 is a second embodiment of this invention, in that instead of being one piece it is three nestable sections.

SUMMARY OF THE INVENTION

A removably attachable support for a laptop/notebook computer that is light in weight and which when attached to the underside of the base of the computer will permit the computer to glide a short distance from one person to another when the computer is nudged or pushed slightly across a table top. The support is preferably an annular member of a generally hemispherical cross-section.

DESCRIPTION OF THE PREFERRED EMBODIMENT

Figure 1:
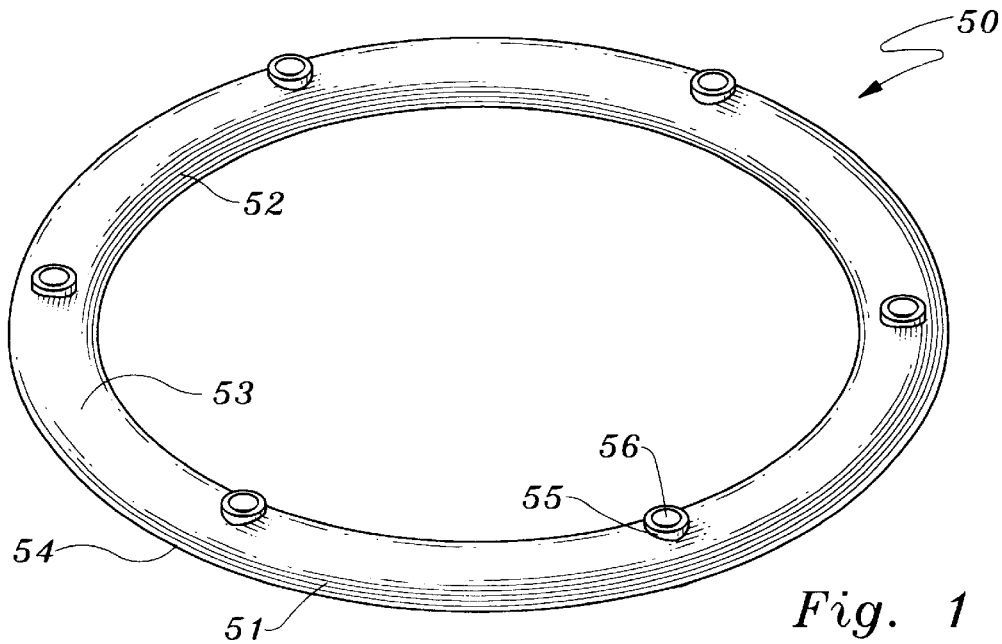
FIG. 1 is a bottom perspective view of the device of this invention.
Figure 2:
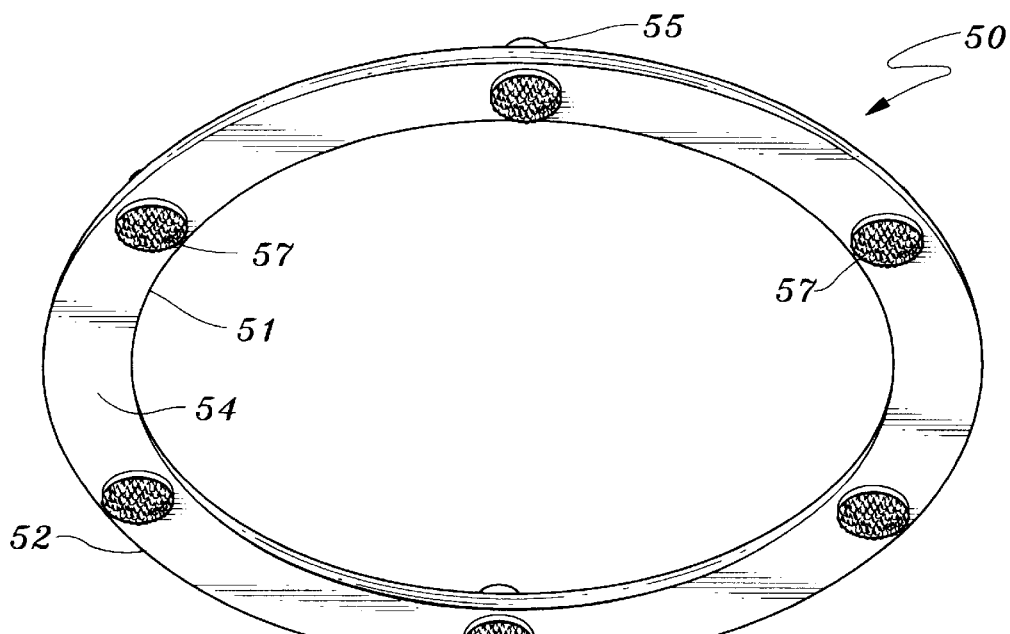
FIG. 2 is a top perspective view thereof.

In FIGS. 1 and 2 there is shown the first embodiment of the relocateable removable support 50 of this invention. The support or device 10 comprises a base 50 which in FIGS. 1 through 4 is an annular member which has a top wall 53 and a spaced bottom wall 54. These two walls are connected to here inwardly converging side walls, 51 the outer and 52 the inner as seen in FIG. 4. Thus, the top wall or surface 53 is of a greater diameter then the bottom wall or surface 54. For ease of manufacturing and attachment to the computer, the support may be generally hemispherical in cross section as shown. If desired base 50 could be of square cross section but such would utilize more material and add to the cost of manufacturing.

Figure 3:
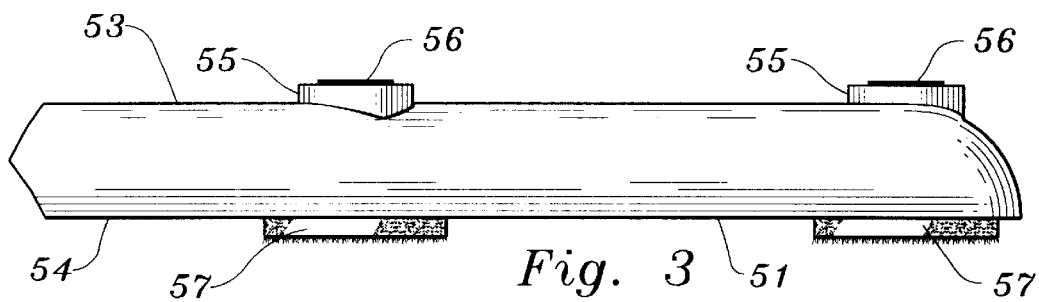
FIG. 3 is an elevational view of a portion of the device of this invention.

FIG. 3 is an elevational view of a portion of this device, while FIG. 4 is a perspective view of a portion of this annularly configured device.

As seen in FIG. 3, a plurality of preferably "female" Velcro® tabs 57 are adhesively attached at suitable spaced locations upon the top wall 53 of the support. In a support that is about eight inches in diameter as would be used for most laptop and notebook computers six equally spaced Velcro® tabs is suggested. For larger diameter computers wherein a ten inch diameter support would be preferred, about eight such Velcro® tabs are recommended. Subnotebooks would utilize a support of about 6 inches in diameter and would employ fewer tabs. Adhesive backed Velcro® tabs are available in the marketplace.

Velcro® is a registered trademark of Velcro S. A. of Fribourg Switzerland for its "hook and pile" fastener elements. One of the members, the "pile" —often called the female—is a strip of relatively stiff fibers resembling a carpet. The other member or male strip comprises a base having a large plurality of hook-shaped fibers thereon. These strips or members mate together firmly, but not inseparably upon being pressed together. Disengagement is effected by a hand "peeling" force. Materials of this nature are disclosed and claimed in U.S. Pat. No. 4,047,250 among others.

As seen also in FIG. 3, each support 10 includes a plurality of thickened or raised flat areas 55, on the underside of the base which serve as feet. An eight inch diameter unit would normally have about six to eight such thickened flat areas, 55. Each foot area 55 has an adhesively mounted glide disk 56 of Teflon® or equal or nylon adhered thereto.

Each such disk need be no thicker than about 1/32nd to 1/16th inch in elevation.

Adhesive backed glides of this nature can be die cut from sheets of such material. These sheets and/or precut disks are available from various sources in the marketplace.

The aforementioned bottom surface 54 of device 10 may be flat with the raised flat areas for the adhesive glides 56 or as shown in FIG. 4, the bottom surface may be arcuate with the raised flat areas at approximate locations as noted above.

In FIG. 5, which depicts a laptop computer in the open position but spatially set upside down such that the underside of the base portion 102 is seen. This wall is designated 108 and is seen to have the base 50 attached thereto. This is achieved by a mating of the male and female portions of the Velcro® fastener. The male portion 109 are seen spaced in a circle adhesively secured to the bottom wall 108 of base 102 in FIG. 6. Designator 107 is the hinge to close the computer.

FIG. 7 shows an open laptop ready for use with the device 50 securely in place. It is only due to the prospective view of this drawing that device 10 can not be seen and this is what is intended. That is, the computer 100 is raised up from the table 150 by the thickness of the device 10, which ranges from 3/8" to 3/4" in elevation.

Also visible in this figure are the screen 101, the keyboard 103, a glide path pointer or mouse 104, and a floppy disk drive 105. Designator 106 is the battery storage section. Other conventional computer peripherals such as a CD ROM player and modem and fax calculators will not impede the placement or use of device 50.

OPERATION

When a first user wants a second party to view the computer, when in the open position of FIG. 7, the first party gives a nudge to the computer which is resting on the attached support 50. It will slide about 2 feet with a slight nudge. This is enough to change disposition when the unit is desired to be relocated from a position in front of a user to a new position in front of a customer or client.

Since the base 50 is removably secured by the mating of male and female Velcro® tabs 57 and 109, a separation of these permits the user to store device 10 in a storage bag or other suitable location during periods of non-need or non-use.

While the support of this invention is most easily made as a one-piece annular member, it can also be manufactured as a two or three-piece interlocking unit, to reduce packaging and storage requirements. Such a unit is contemplated by this invention and is shown in FIG. 8. Thus, base 150 is seen to comprise three similarly shaped arcuate segments 155, 156, and 157. Each of these three segments includes a first wider portion 160, with a hollowed out terminal recess 161 therein, and a slightly smaller in cross section second terminal portion or proboscus 162. The depth of recess 161 is slightly greater than the length of proboscus 162. Assembly is achieved by frictionally engaging each terminal portion 162 into a hollowed out terminal recess 161 as is readily understood. All other aspects of the this device which has base 150 are similar to those previously discussed with respect to the device with base 50. Since like numbers refer to like parts, there is no need to repeat that which has been adequately described above.

Figure 9:
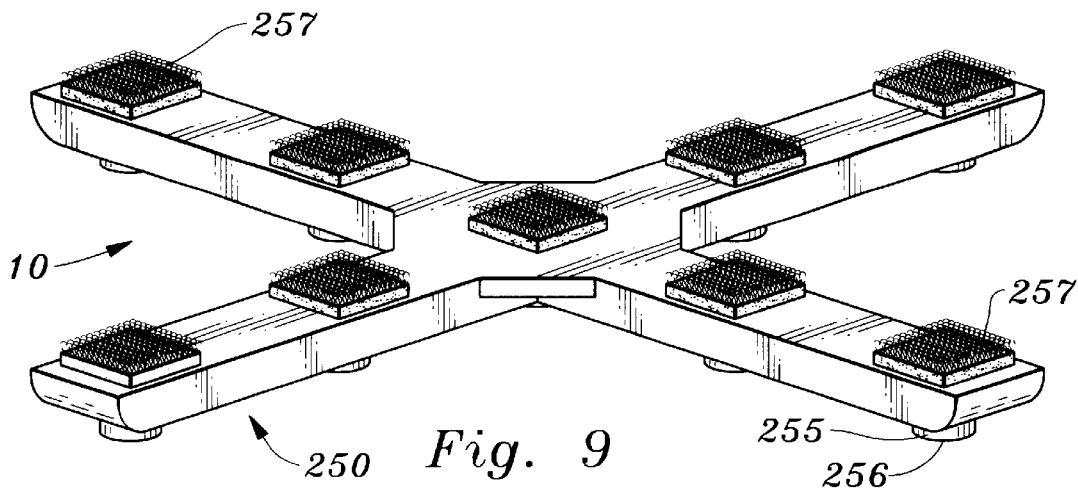
FIG. 9 is a top perspective view of a second configuration of the first embodiment.

Device 10 can be made in other configurations of the base. Thus in FIG. 9, the base 250 is configured as an "X". The same feet areas are shown, here designate 255 and the tabs or glides are denoted as 256. Velcro® tabs 257 similar to the tabs 57 are shown at suitable locations.

Figure 10:
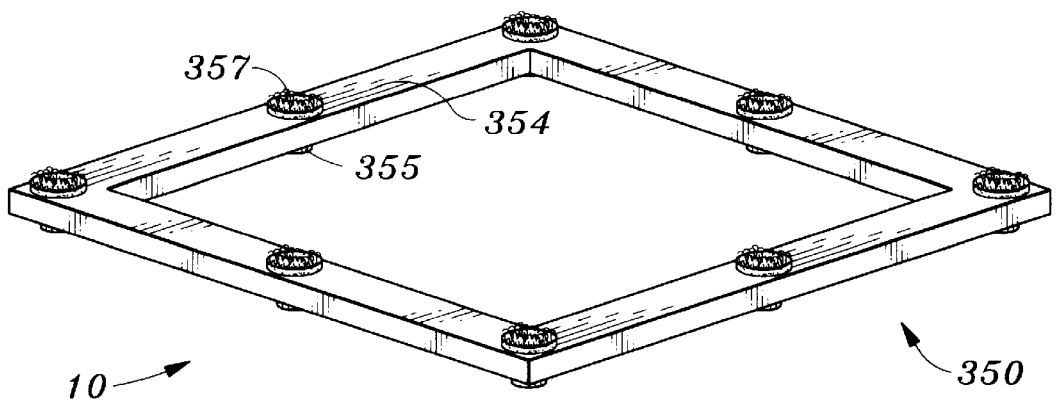
FIG. 10 is a top perspective view of a third configuration of the first embodiment.
Figure 11:
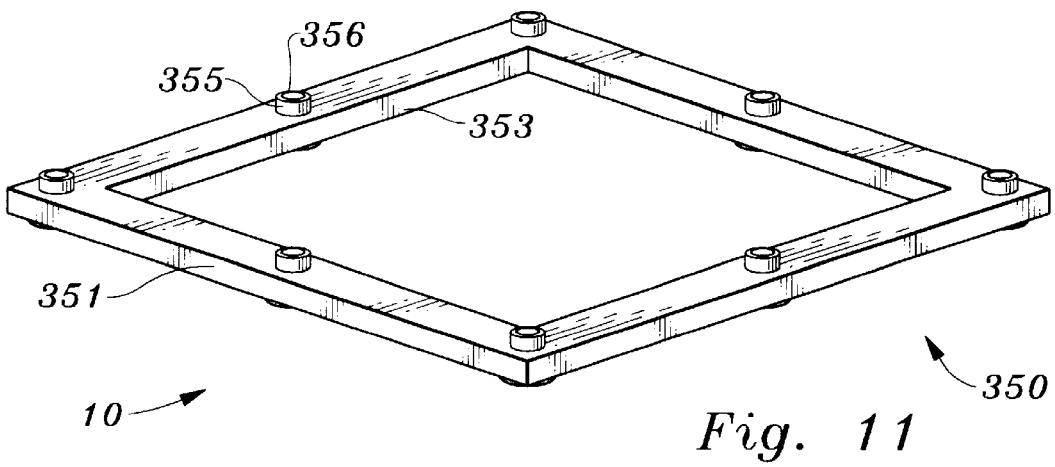
FIG. 11 is a bottom perspective view of the embodiment of FIG. 10.

FIGS. 10 and 11 illustrate yet another configuration of the base, here designated 350. The base 350 is an open rectangle or square of two pairs of spaced segments all connected at right angles. FIG. 10 is a top perspective veiw and FIG. 11 a bottom perspective view. The nomenclature utilized previously is retained, in that the outer wall is 351, the inner wall is 352, the top wall is 354 and the bottom wall where the feet 355 with glides 356 thereupon are, is designated 353, while the Velcro® tabs are designated 357. Here, however, the cross-section is a square.

It is also to be seen that the devices having configurations with base 250 and 350 could also be made as multicomponent devices similar to the device having base 150.

The embodiments of this invention may be made of filled or unfilled plastic such as ABS, high density polystyrene, polycarbonate, and polyvinyl chloride. If the wall thickness is sufficient, hollow as well as solid material bases may be employed. Metallic units of aluminum or titanium are also contemplated, both for the one piece and multicomponent units.

It is seen that the advantage of using the series of Velcro® tabs as the attachment means is the fact that the portion of the tab permanently affixed to the underside of the computer adds little or no weight and does not interfere with the computer being used without the support of this invention if such is desired. Other attachment means such as engageable snaps are also contemplated, but are less preferred. One portion of a metal snap could damage certain surfaces if left unengaged to the device, on the underside of the computer.

Since certain changes may be made in the above described apparatus without departing from the scope of the invention herein involved, it is intended that all matter contained in the above description and shown in the accompanying drawings shall be interpreted as illustrative and not in a limiting sense.

I claim:

1. A laptop/notebook computer relocation device which, when attached to a laptop/notebook computer will permit such a computer to be slid a short distance from an operator to a second party, which device comprises:

a base member having a flat top wall and a flat spaced bottom wall;

a series of spaced feet disposed on the bottom wall of the base member, each of said feet having attached thereto a glide member substantially disk-shaped of flat plastic with a low coefficient of friction and a series of spaced tabs of a releasable means for attaching the base member to the underside of a computer, disposed on the top wall thereof whereby the device is adapted to slide from a first user at a first position to a second user at a second position.

2. The device of claim 1 wherein the base is an annular member of a hemispherical cross-section.

3. The device of claim 1 wherein the base is an "X" shaped member.

4. The device of claim 1 wherein the base is a rectangle having a central opening therethrough.

5. The device of claim 4 wherein the base has a cross section that is a square.

6. The device of claim 1 wherein each glide is an adhesively mounted disk.

7. The device of claim 1 wherein the base member is sized to fit entirely beneath a laptop/notebook computer.

8. The device of claim 1 wherein the series of spaced tabs is a series of hook and loop engagement means.

9. A support means for removable attachment to a laptop/notebook computer's base for relocation of a computer on a table top, which support means comprises a base member formed from a plurality of detachable interlocking segments, said base member having a solid flat top surface with a series of spaced hook and loop engagement member tabs disposed thereon, said base member also having a plurality of spaced feet on the underside, each of which feet has a glide member substantially disk-shaped of flat plastic thereon having a low coefficient of friction whereby the support means is adapted to slide from a first user at a first position to a second user at a second position.

10. The support means of claim 9 wherein each glide is an adhesively mounted disk.

11. The support means of claim 9 wherein each segment is arcuate and the device is round upon assembly.

12. In combination, a laptop/notebook computer and a laptop/notebook computer relocation device which permits the computer to be slid a short distance from an operator to a second party, which comprises:

a conventional laptop/notebook computer, having a base with an underside, and a support comprising a base member having a flat top wall and a flat spaced bottom wall;

a series of spaced feet disposed on the bottom wall of the base member, each of said feet having attached thereto a glide member substantially disk-shaped of flat plastic with a low coefficient of friction , and a series of aligned spaced tabs of a releasable engagement means disposed on the top wall of the support and on the underside of the computer, attaching the support to the underside of the base of the computer whereby the combination of the laptop/notebook computer and the laptop/notebook computer relocation device is adapted to slide from a first user at a first position to a second user at a second position.

13. The computer and relocation device of claim 12 wherein each glide is an adhesively mounted disk.

14. The computer and relocation device of claim 12, wherein the series of tabs is a series of engageable hook and loop tabs.

* * * * *